US009342952B2

(12) United States Patent
Hollis et al.

(10) Patent No.: US 9,342,952 B2
(45) Date of Patent: May 17, 2016

(54) SYSTEMS AND METHODS FOR CREATING AND MAINTAINING AN INVENTORY LIST AND VERIFYING COMPONENTS OF GAMING EQUIPMENT

(71) Applicants: Zachary Hollis, Denver, CO (US); Christopher Van Emmerik, Westminster, CO (US)

(72) Inventors: Zachary Hollis, Denver, CO (US); Christopher Van Emmerik, Westminster, CO (US)

(73) Assignee: Gaming Laboratories International, Inc., Lakewood, NJ (US)

( * ) Notice: Subject to any disclaimer, the term of this patent is extended or adjusted under 35 U.S.C. 154(b) by 0 days.

(21) Appl. No.: 14/015,201

(22) Filed: Aug. 30, 2013

(65) Prior Publication Data

US 2014/0066193 A1 Mar. 6, 2014

Related U.S. Application Data

(63) Continuation-in-part of application No. 13/602,896, filed on Sep. 4, 2012.

(51) Int. Cl.
*A63F 13/00* (2014.01)
*G07F 17/32* (2006.01)

(52) U.S. Cl.
CPC .................................. *G07F 17/3241* (2013.01)

(58) Field of Classification Search
CPC ......................... G07F 17/3202; G07F 17/3241
USPC ........................................................... 463/29
See application file for complete search history.

(56) References Cited

U.S. PATENT DOCUMENTS

| | | | | |
|---|---|---|---|---|
| 7,043,641 | B1 | 5/2006 | Martinek et al. | |
| 2003/0195033 | A1 | 10/2003 | Gazdic et al. | |
| 2004/0259633 | A1 * | 12/2004 | Gentles et al. | 463/29 |
| 2007/0136817 | A1 * | 6/2007 | Nguyen | 726/26 |
| 2008/0172560 | A1 | 7/2008 | Hughes et al. | |
| 2008/0200256 | A1 | 8/2008 | Gagner et al. | |
| 2008/0234050 | A1 | 9/2008 | Joshi | |
| 2008/0318669 | A1 | 12/2008 | Buchholz | |
| 2008/0318686 | A1 | 12/2008 | Crowder et al. | |
| 2009/0280907 | A1 | 11/2009 | Larsen et al. | |
| 2012/0083908 | A1 | 4/2012 | Carpenter et al. | |
| 2012/0131322 | A1 | 5/2012 | Smith et al. | |

* cited by examiner

*Primary Examiner* — Milap Shah
*Assistant Examiner* — Thomas H Henry
(74) *Attorney, Agent, or Firm* — Fox Rothschild LLP; Richard C. Woodbridge; Robert J. Sacco

(57) ABSTRACT

Systems and methods for authenticating an inventory list of the components installed on electronic gaming machines, including receiving, from an input device, an input signal indicating the identity and location of a gaming machine, an electronic signature of each installed component, receiving the electronic signature and software components which should be installed on the gaming machine, and comparing electronic signature of the components. If the electronic signature of the components does not match the received electronic signature of what should be installed on the gaming machine, and sending a confirmation to the inventory database component indicating the correct software is not installed.

20 Claims, 10 Drawing Sheets

SYSTEMS AND METHODS FOR CREATING AND MAINTAINING AN INVENTORY LIST AND VERIFYING COMPONENTS OF GAMING EQUIPMENT

REFERENCE TO RELATED APPLICATIONS

This application is a non-provisional application claiming priority to U.S. patent application Ser. No. 13/602,896 filed Sep. 4, 2012, which is hereby incorporated by reference as if fully disclosed herein.

FIELD OF THE DISCLOSURE

Embodiments include systems and methods for creating and maintaining an inventory database and verifying installed hardware and software components of gaming equipment.

BACKGROUND

For many years casino operators and regulators have struggled to have a useful system to use to track installed components such as the software and hardware that comprises the slot machines on the floor of a casino. Furthermore, relating these components to their regulatory approval status in multiple jurisdictions can be a tedious and sometimes impossible task.

Historically, creating and maintaining an inventory list of the installed components in a casino is a largely manually task, and as a result, prone to errors. The inventory list is often created under the restraints of an accounting system "slot file" and does not have flexibility regarding the information that can be manually entered.

Many conventional systems only allow for authentication and verification of single gaming machines. For example, in U.S. Patent Application Publication No. 2003/0195033, a method of performing self-authentication in gaming machines is provided. Additional background on gaming machine authentication may also be found in U.S. Pat. No. 7,043,641 which discloses methods of encryption in a secure computerized gaming system. Neither reference discloses any inventory management features or provides any way to allow owners and regulators to quickly view the status of multiple machines.

Some systems do provide for gaming content authentication, verification, and dissemination. For example, U.S. Patent Application Publication No. 2004/0259633 provides methods and systems for remote authentication of gaming software. Additionally, U.S. Patent Application Publication No. 2008/0318669 discloses a wagering game content approval and dissemination system. These systems, however, are used to verify software for images before distribution and installation on the game machines. Additionally, these systems do not incorporate any system to track inventories that include certifications.

A system that can solve all of these problems by utilizing a number of new technologies and coupling the results with a pre-existing unique knowledgebase is desirable.

SUMMARY

Systems and methods for authenticating an inventory list of the components installed on casino gambling devices and/or Internet gaming applications, including receiving, from an input device, an input signal indicating the identity and location of a gambling device, and an electronic signature of each installed component, receiving the electronic signature and software components which should be installed on the gambling device, comparing electronic signature of the components, are provided. If the electronic signature of the components does not match the received electronic signature of what should be installed on the gambling device, and sending a confirmation to the inventory database component indicating the correct software is not installed. If the electronic signature of the components does match the received electronic signature, the confirmation indicates that the correct software is installed.

In an aspect of the invention, systems and methods are provided for generating one or more messages to a regulator and/or a casino operator indicating problem software installations on one or more gaming machines. These include receiving into an inventory database the identity and signature of all components installed on the one or more gambling device, the inventory database comprising a database and an associated electronic circuit, comparing, by the electronic circuit, the received identity and signature of all installed components with the identity and signature of the approved components for the jurisdiction, and reporting, by the electronic circuit, to the casino operator all components whose signature does not match the signature of an approved component.

In additional aspects of the invention, a live video of the gambling device may be captured using a camera associated with the electronic circuit, and the captured video may be streamed to a live video feed.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

This document describes a system and method for creating and maintaining an inventory list of the components installed on casino gaming devices, including but not limited to slot machines, integrating multiple technologies and coupling the results with a unique knowledgebase. Although described in terms of various components used to implement the methods, the present invention can be used in a variety of system configurations, such as, but not limited to, mobile phone applications, portable computer applications, PDA applications, and the like. Also, various system components may be combined into a few or even one hardware component(s) without affecting overall functionality. Exemplary implementing system embodiments of the present invention will be described below in relation to FIGS. 2-3. Exemplary method embodiments of the present invention will be described below in relation to FIGS. 4-9.

Exemplary Systems

Figure 1:
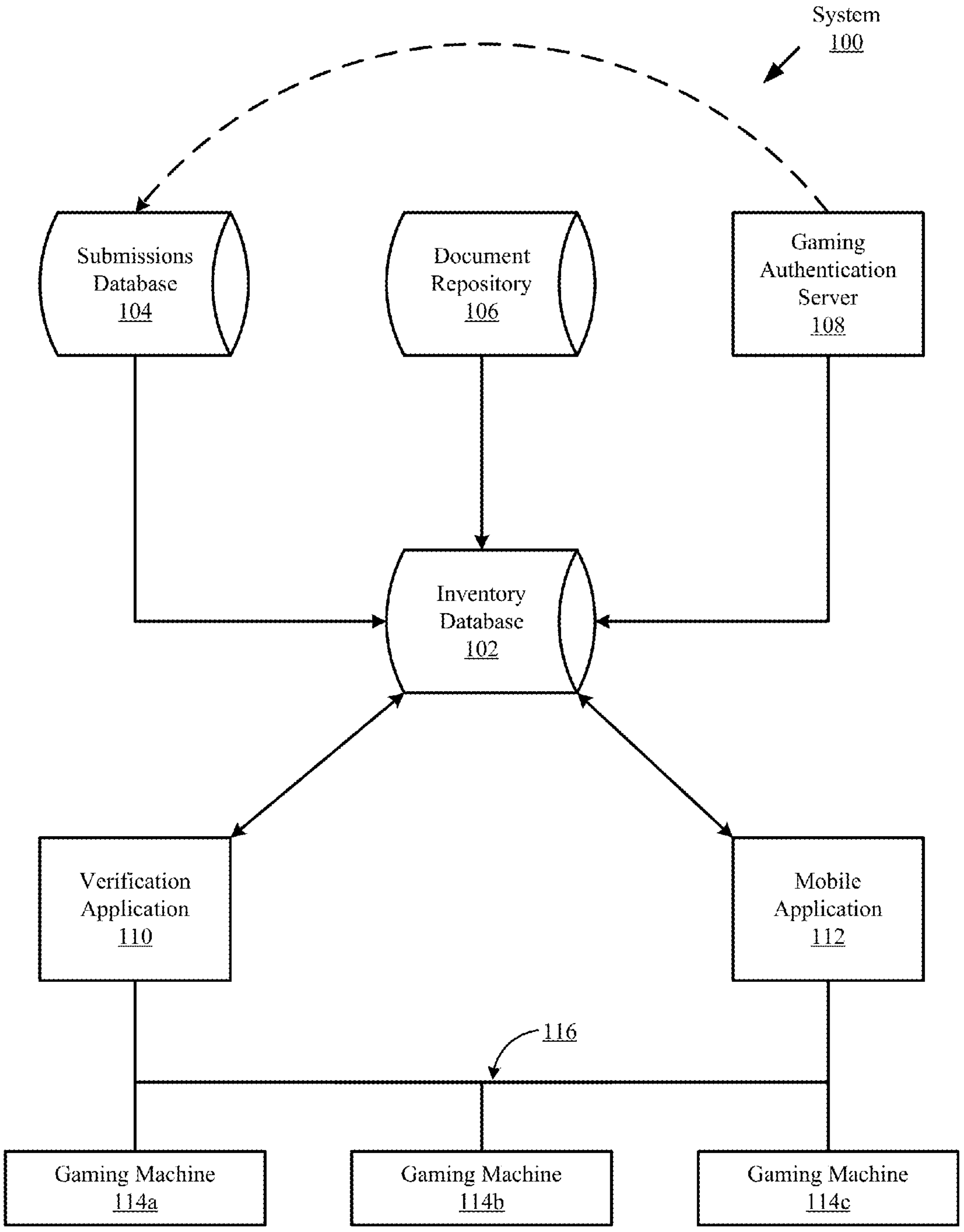
FIG. 1 is a schematic system diagram of an example inventory management, verification, and authentication system.

Referring now to FIG. 1, there is provided a block diagram of an exemplary system 100 that is useful for understanding various embodiments of the present invention. The system 100 comprises a mobile application 112, a verification application 110, a gaming authentication server 108, an inventory database 102, a submissions database 104, and a document repository 106. Also depicted are exemplary gaming machines 114*a*, 114*b* and 114*c*, as well as optional gaming machine interconnectivity 116.

To facilitate a unique signature for each regulator, a gaming authentication server 108 is provided to allow the signature generated by the game to be "seeded" with a unique key. This eliminates the possibility of a game just keeping a stored signature and retrieving it when a request is received by verification application 110. This provides a level of comfort to a regulator, casino operator, and/or game manufacturer. However, it also requires a tedious step, which has to be performed in advance, of determining what the correct signature should be from the program if it uses the unique "seed."

An embodiment of the invention uses a protocol to communicate game components and signatures. For example, GAT 3.50.1 protocol was created to facilitate the communication of a slot machine's content and the content's associated signatures and may be employed.

The submissions database 104 contains, among other items, a plurality of signatures that may represent some or all software that can reside in a slot machine. This database may also include meta information associated with the signatures and the images and services that can generate the signatures using "seed" values.

The mobile application 112 is a mobile application that allows a user to track the programs approved in their jurisdiction and their associated approval status from their mobile device. This information may then be used with the inventory tracking system to allow regulators and casino operators to track the approved programs and relate it to the actual programs on the casino floor. In an embodiment of the invention, a mobile application 112 is deployed on a mobile device, such as communication device 200 depicted in FIG. 2.

The verification application 110 is a utility that is used to verify gaming machine programs by generating a signature that is representative of the game machine program image, i.e. the data that comprises at least a portion of the gaming machine program. This signature can then be used to validate the program against a signature generated by gaming authentication server 108. The signature communicates that the program is in fact the program that was validated to comply with the applicable regulations. The verification application 110 may be configured to also support a protocol to communicate with the gaming application which is used by games to communicate, through a communication port, information about the loaded software. The communication protocol can also be used to request the game generate and return a signature that represents each of the pieces of software that it contains.

Gaming machine content, e.g., the software that executes the gaming machine, may be tied to the actual slot machines on the casino floors. To achieve this, an inventory database 102 may be created for each casino containing all of the information associated with some or all of the machines in the casino.

One step in the process of creating an inventory is determining all of the programs that are in a gaming machine. Most casino inventory lists are designed to track a single machine on the floor and lack the concept of the machine containing a number of gaming machine components. Furthermore, gathering and entering this information is a difficult and tedious process.

The submissions database 104 is used to maintain all of the gaming application specific information from all software approvals and/or regulatory software certifications performed as well as the regulatory approval status of the components. This includes the type of software, the jurisdictions it is approved in, and its representative signatures, and the like.

All of the information regarding the software and hardware is kept in a centralized location, a document repository 106. This repository includes documentation on how games behave, images relating to each game, testing results, par sheets, and payglass.

The submissions database 104 and document repository 106 may be stand-alone database servers, a persistent drive and operating software associated with the gaming authentication server 108, a cloud-computing database "cloud", or may be implemented by other means.

Figure 2:
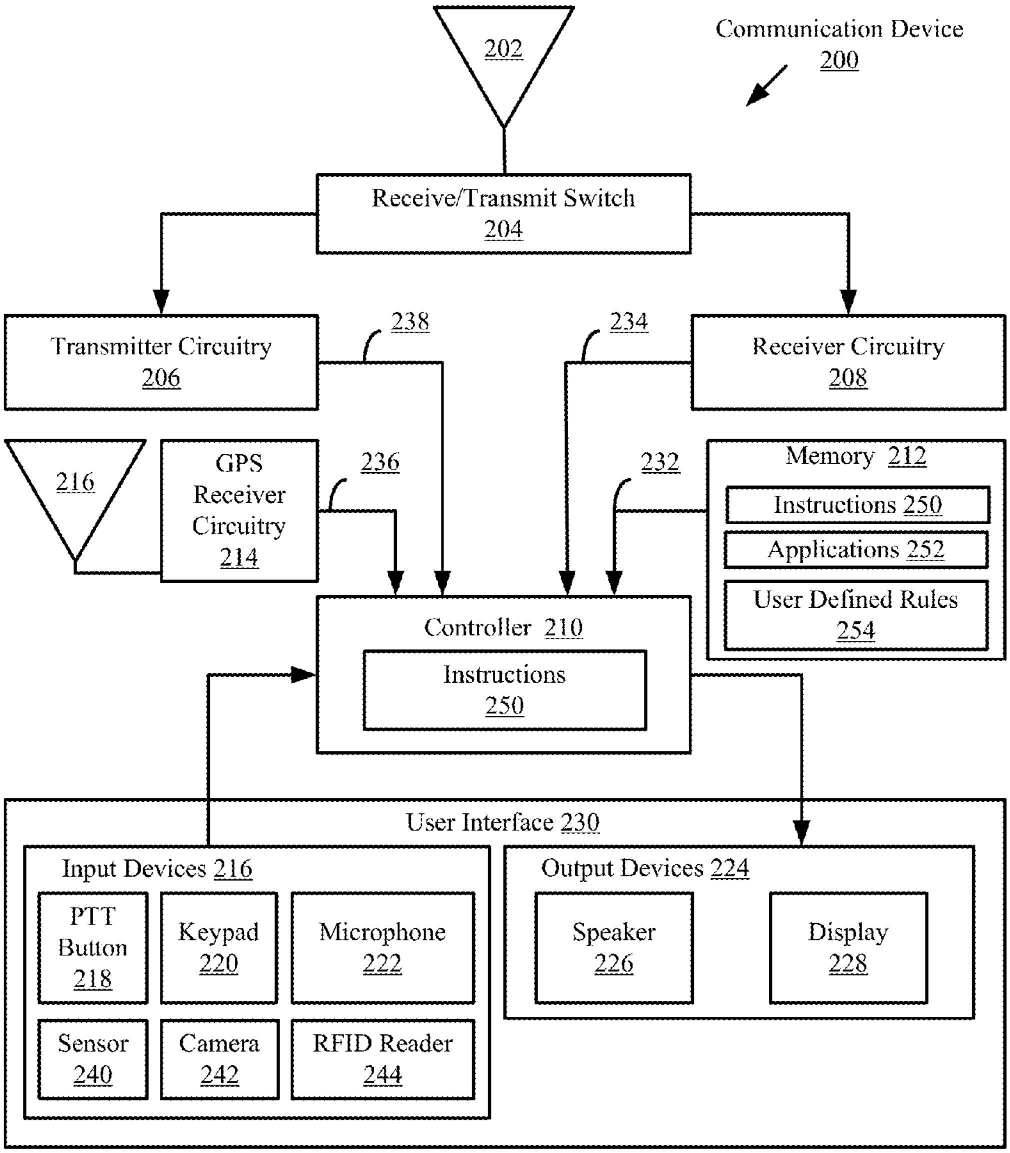
FIG. 2 is a block diagram of an example communication device.

Referring now to FIG. 2, there is provided a more detailed block diagram of the communication device 200. The communication device 200 will be described herein as comprising a mobile phone or a smart phone. However, the present invention is not limited in this regard. For example, the communication device can alternatively comprise a PDA, a tablet Personal Computer ("PC"), or the like.

Notably, the communication device 200 can include more or less components than those shown in FIG. 2. For example, the communication device 200 can include a wired system interface, such as a universal serial bus interface (not shown in FIG. 2). However, the components shown are sufficient to disclose an illustrative embodiment implementing the present invention.

As shown in FIG. 2, the communication device 200 comprises an antenna 202 for receiving and transmitting Radio Frequency (RF) signals. A receive/transmit (Rx/Tx) switch 204 selectively couples the antenna 202 to the transmitter circuitry 206 and receiver circuitry 208 in a manner familiar to those skilled in the art. The receiver circuitry 208 demodulates and decodes the RF signals received from a network to derive information therefrom. The receiver circuitry 208 is coupled to a controller 210 via an electrical connection 234. The receiver circuitry 208 provides the decoded RF signal information to the controller 210. The controller 210 uses the decoded RF signal information in accordance with the function(s) of the communication device 200. The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 202 for transmission to an external device.

The controller 210 stores the decoded RF signal information in a memory 212 of the communication device 200. Accordingly, the memory 212 is connected to and accessible by the controller 210 through an electrical connection 232. The memory 212 can be a volatile memory and/or a nonvolatile memory. For example, the memory 212 can include, but is not limited to, a Random Access Memory (RAM), a Dynamic Random Access Memory (DRAM), a Static Random Access Memory (SRAM), Read-Only Memory (ROM) and flash memory. The memory 212 can also have stored therein the software applications 252 and user-defined rules 254.

The software applications 252 may include, but are not limited to, applications operative to provide telephone services, network communication services, Internet connectivity and access services, commerce services, email services, web based services, electronic calendar services, as well as software providing the functionality required to operate the methods of the present invention. An application may be operative to connect to a server and synchronize a local copy of an inventory database with a server based copy. In another embodiment an application may be operative to connect with a gaming machine to receive information relating to that gaming machine.

As shown in FIG. 2, one or more sets of instructions 250 are stored in the memory 212. The instructions 250 can also reside, completely or at least partially, within the controller 210 during execution thereof by the communication device 200. In this regard, the memory 212 and the controller 210 can constitute non-transient machine-readable media. The term "machine-readable media", as used here, refers to a single medium or multiple media that store the one or more sets of instructions 250. The term "machine-readable media", as used here, also refers to any medium that is capable of storing, encoding or carrying the set of instructions 250 for execution by the communication device 200 and that cause the communication device 202 to perform one or more of the methodologies of the present disclosure.

The controller 210 is also connected to a user interface 230. The user interface 230 is comprised of input devices 216, output devices 224, and software routines (not shown in FIG. 2) configured to allow a user to interact with and control software applications 252 installed on the computing device 200. Such input and output devices respectively include, but are not limited to, a display 228, a speaker 226, a keypad 220, a directional pad (not shown in FIG. 2), a directional knob (not shown in FIG. 2), a microphone 222, a Push-To-Talk ("PTT") button 218, sensors 240, a camera 242 and a Radio Frequency Identification ("RFID") reader 244.

Figure 3:
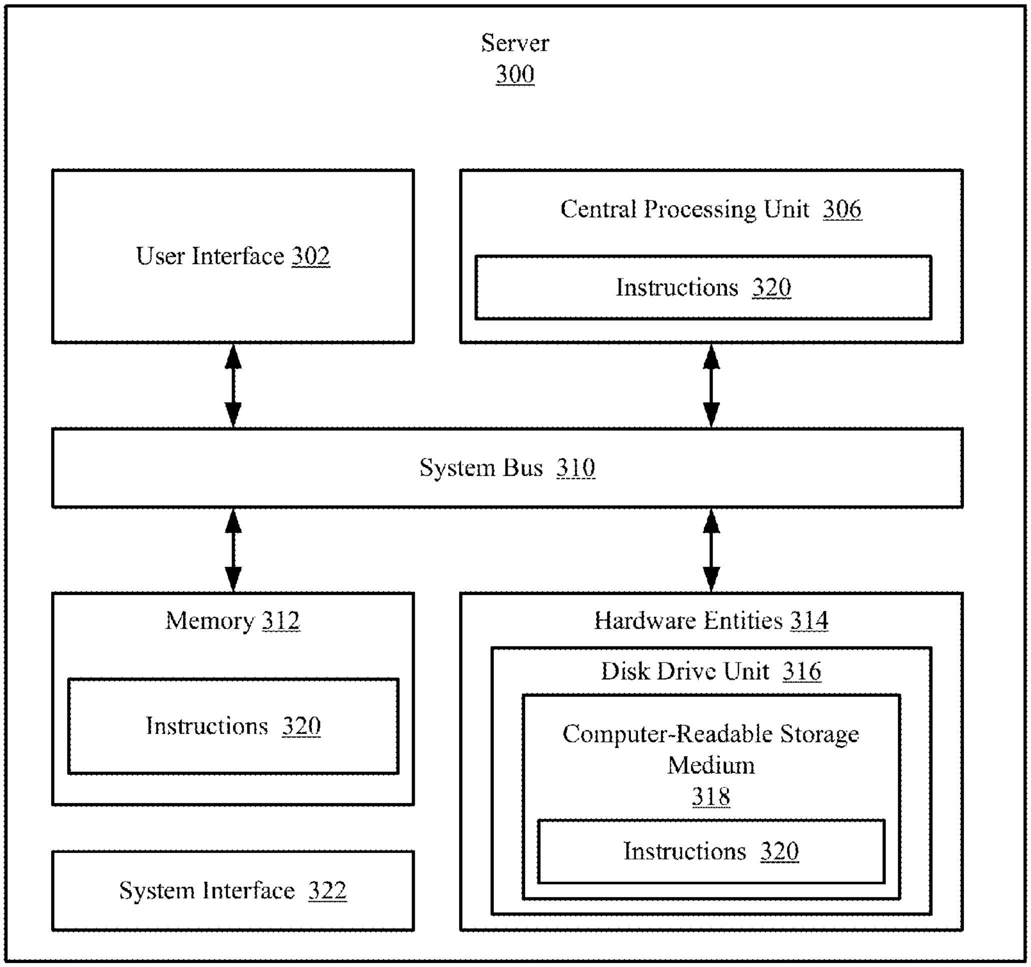
FIG. 3 is a block diagram of an example server.

Referring now to FIG. 3, there is provided a more detailed block diagram of a server 300 of FIG. 1. As shown in FIG. 3, the server 300 comprises a system interface 322, a user interface 302, a Central Processing Unit (CPU) 306, a system bus 310, a memory 312 connected to and accessible by other portions of server 108 through system bus 310, and hardware entities 314 connected to system bus 310. At least some of the hardware entities 314 perform actions involving access to and use of memory 312, which can be a Random Access Memory (RAM), a disk driver and/or a Compact Disc Read Only Memory (CD-ROM). Some or all of the listed components 302-322 can be implemented as hardware, software and/or a combination of hardware and software. The hardware includes, but is not limited to, an electronic circuit.

The server 300 may include more, less or different components than those illustrated in FIG. 3. However, the components shown are sufficient to disclose an illustrative embodiment implementing the present invention. The hardware architecture of FIG. 3 represents one embodiment of a representative server configured to provide supporting services to a user of a communication device (e.g., communication device 200 of FIG. 2). For example, the server 300 may implement a method for lookup of available components and signatures for the relevant jurisdiction using an external database in communication with the server 300 (database not depicted), or the server may use its existing disk drive unit 316, computer-readable storage medium 318 and other facilities to store auction information, as needed. It may also provide dosage factor data to the communication device 200, as needed. Exemplary embodiments of said method will be described below in relation to FIGS. 4-5.

Hardware entities 314 can include microprocessors, Application Specific Integrated Circuits (ASICs) and other hardware. Hardware entities 314 can include a microprocessor programmed for facilitating the provision of the automatic software function control services to a user of the communication device (e.g., communication device 200 of FIG. 2). In this regard, it should be understood that the microprocessor can access and run various software applications (not shown in FIG. 3) installed on the server 300. Such software applications include, but are not limited to, database applications.

As shown in FIG. 3, the hardware entities 314 can include a disk drive unit 316 comprising a computer-readable storage medium 318 on which is stored one or more sets of instructions 320 (e.g., software code or code sections) configured to implement one or more of the methodologies, procedures, or functions described herein. The instructions 320 can also reside, completely or at least partially, within the memory 312 and/or within the CPU 306 during execution thereof by the server 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the server 300 and that cause the server 300 to perform any one or more of the methodologies of the present disclosure.

In an embodiment of the invention, the system is logically comprised of a number of components. Several of these components are already tools that are provided to manufacturers, regulators, and operators. Each component is described with respect to the particular function(s) it performs. Each provides a fundamental piece of the entire system and adds a unique value.

Exemplary Methods

Referring now to FIGS. 4-9, there is provided a series of diagrams that illustrate user interfaces depicting the results of methods for creating and maintaining an inventory list of the components installed on casino gambling devices. It is understood that the processes used in these embodiments may vary somewhat without departing significantly from the scope of the invention.

Generally, the process for the inventory tracking system may be simplified to three steps: input casino data, input program data, and associate data to submissions and certification data.

Figure 4:
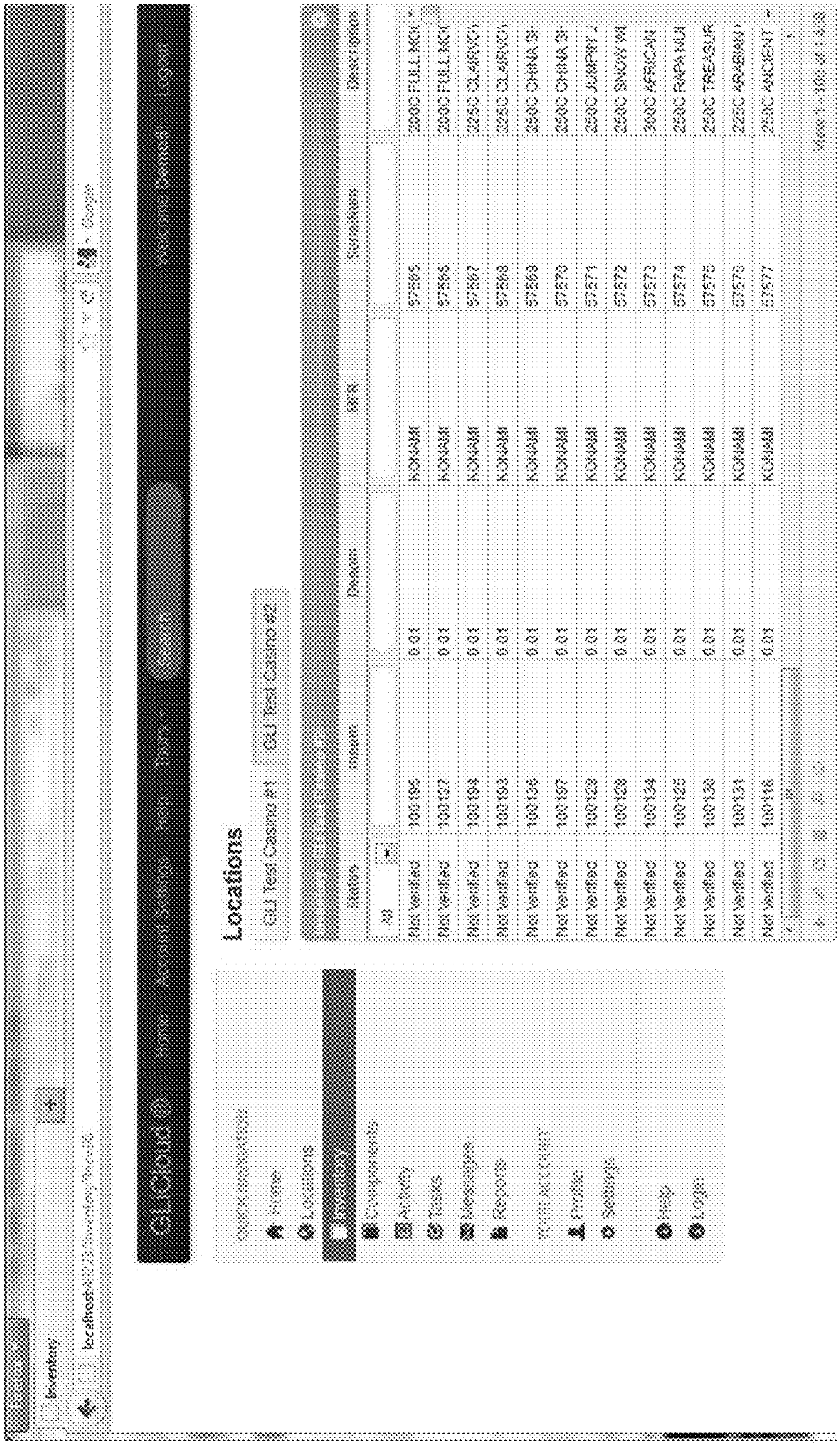
FIG. 4 illustrates a user interface screen showing an example of casino data.

The input of casino data may be performed by reading the data in a spreadsheet and dynamically creating a database based on the information in the spreadsheet. Many regulators and operators are currently using spreadsheets, so using already-existing spreadsheet data provides for efficiency. Alternative methods of inputting casino data may also be employed, either to augment or correct data imported from an existing spreadsheet or as a primary means of obtaining the data. FIG. 4 is an exemplary screenshot of casino data collected from a spreadsheet.

Next, program data is input. This step of inputting the data is potentially the most time consuming and error prone. In an embodiment of the system, a verification component 110 may be used on the casino floor to both validate the programs in the machine and relate them to the inventory system, essentially by querying the game to report what it contains.

In a typical scenario, the agent from the regulatory body, or the casino operator, hereinafter "user", selects the machine they are validating by selecting it from the inventory window, such as depicted in FIG. 4. The game will then be presented to the regulator/operator by a unique identifier selected when the information was imported. This unique identifier may usually be the serial number of the cabinet or the asset number associated to the cabinet by the accounting system, or the like.

Next, the operator or regulatory body may connect an interface cable between the game and their laptop and select verify on the verification application 110. Once the game communicates the information, the verification application 110 relates it to information already downloaded to the laptop. This information may be the data maintained in the document repository 106 and/or submissions database 104, as well as in the inventory database 102 and the unique electronic signatures maintained on the gaming authentication server 108.

Figure 5:
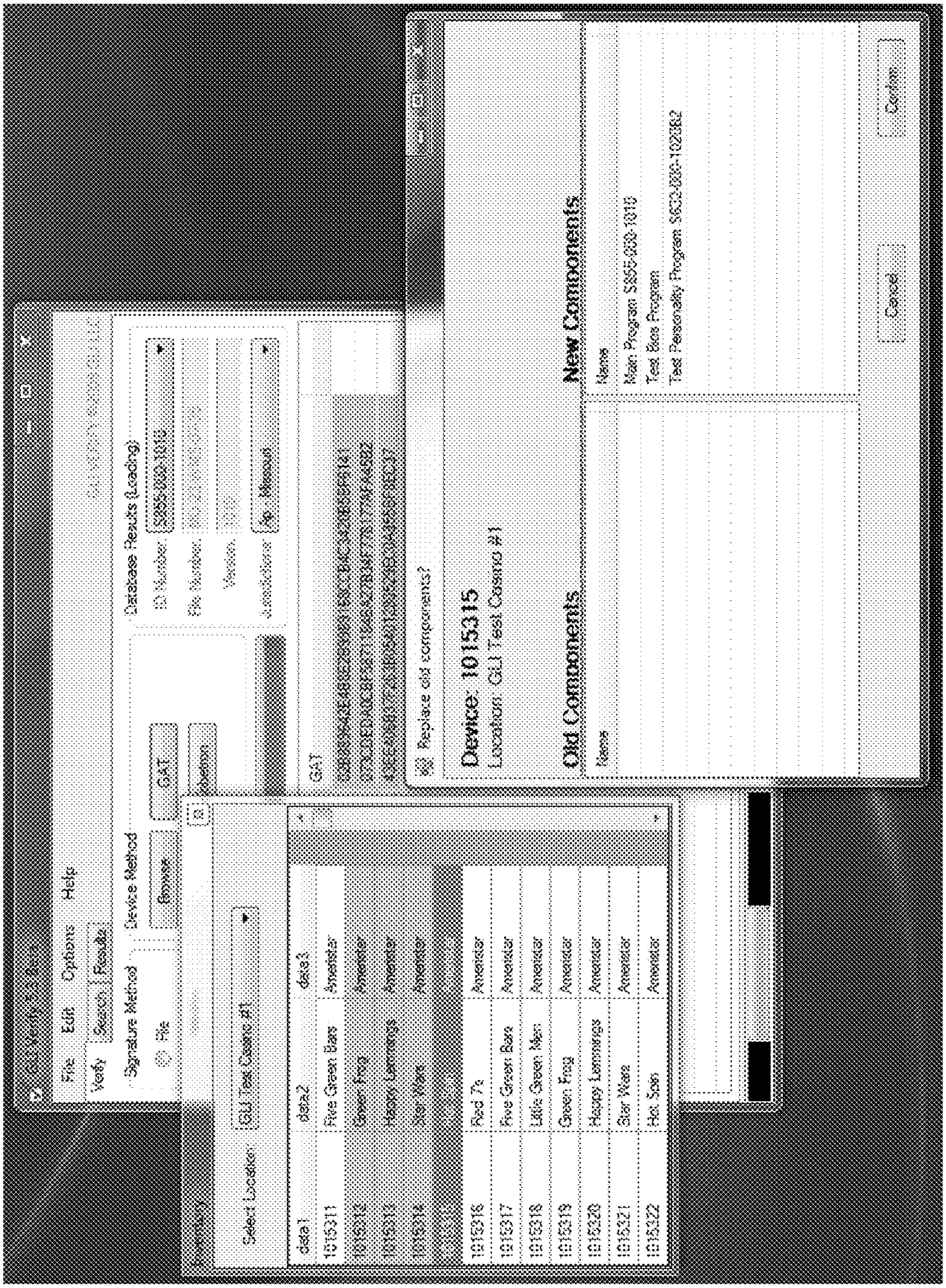
FIG. 5 illustrates a user interface screen showing an example of collected data.

Once the verification application 110 has communicated that the programs in the slot machine are known and approved, the user is asked if they want to input this information regarding the components in the game into the inventory database. If the user chooses to import the data it is will be stored locally and uploaded to the inventory database when the user chooses. FIG. 5 depicts an exemplary user interface displaying the collected data.

Figure 6:
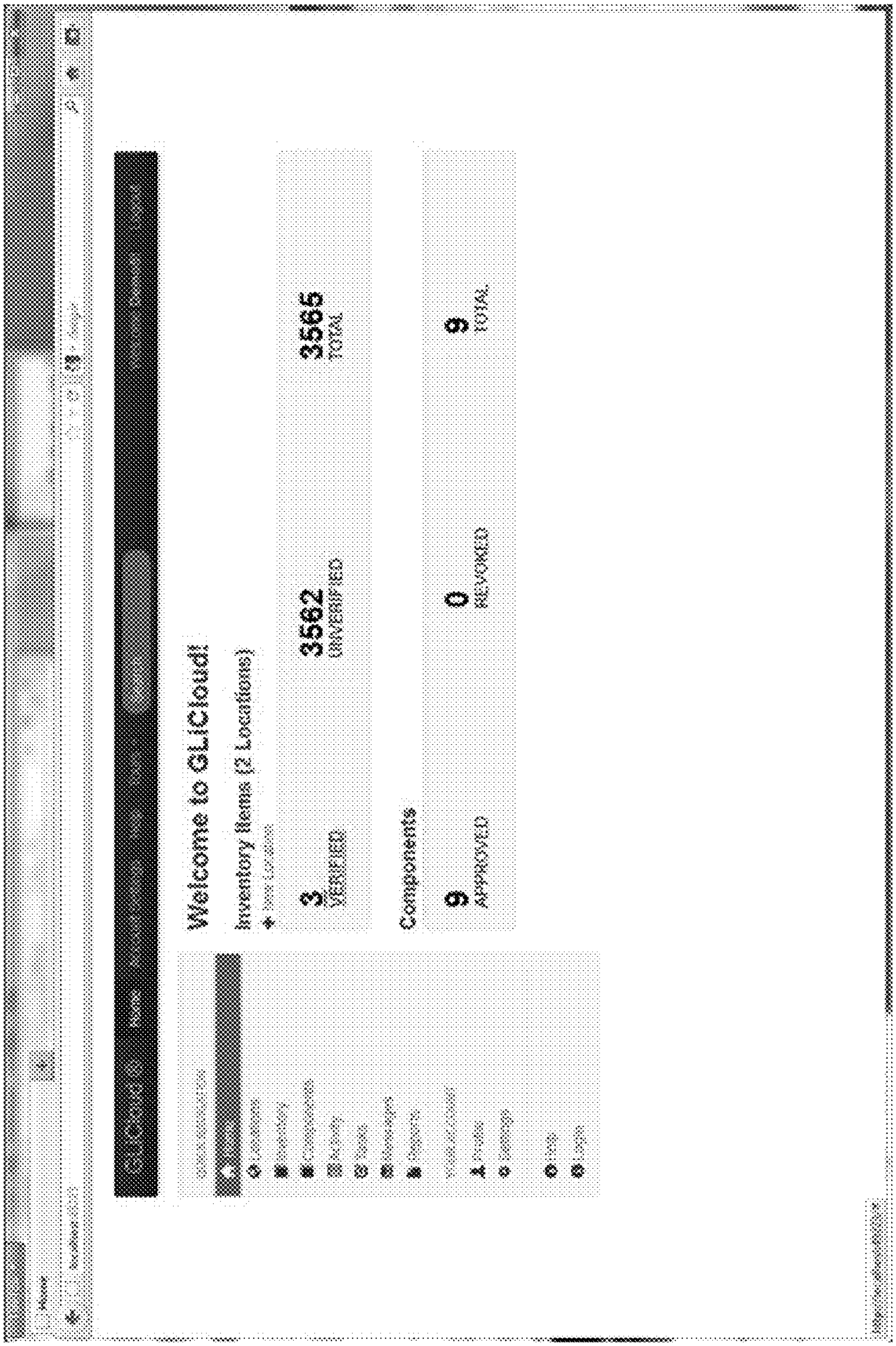
FIG. 6 illustrates a user interface screen showing an example of the accumulation of casino data.
Figure 7:
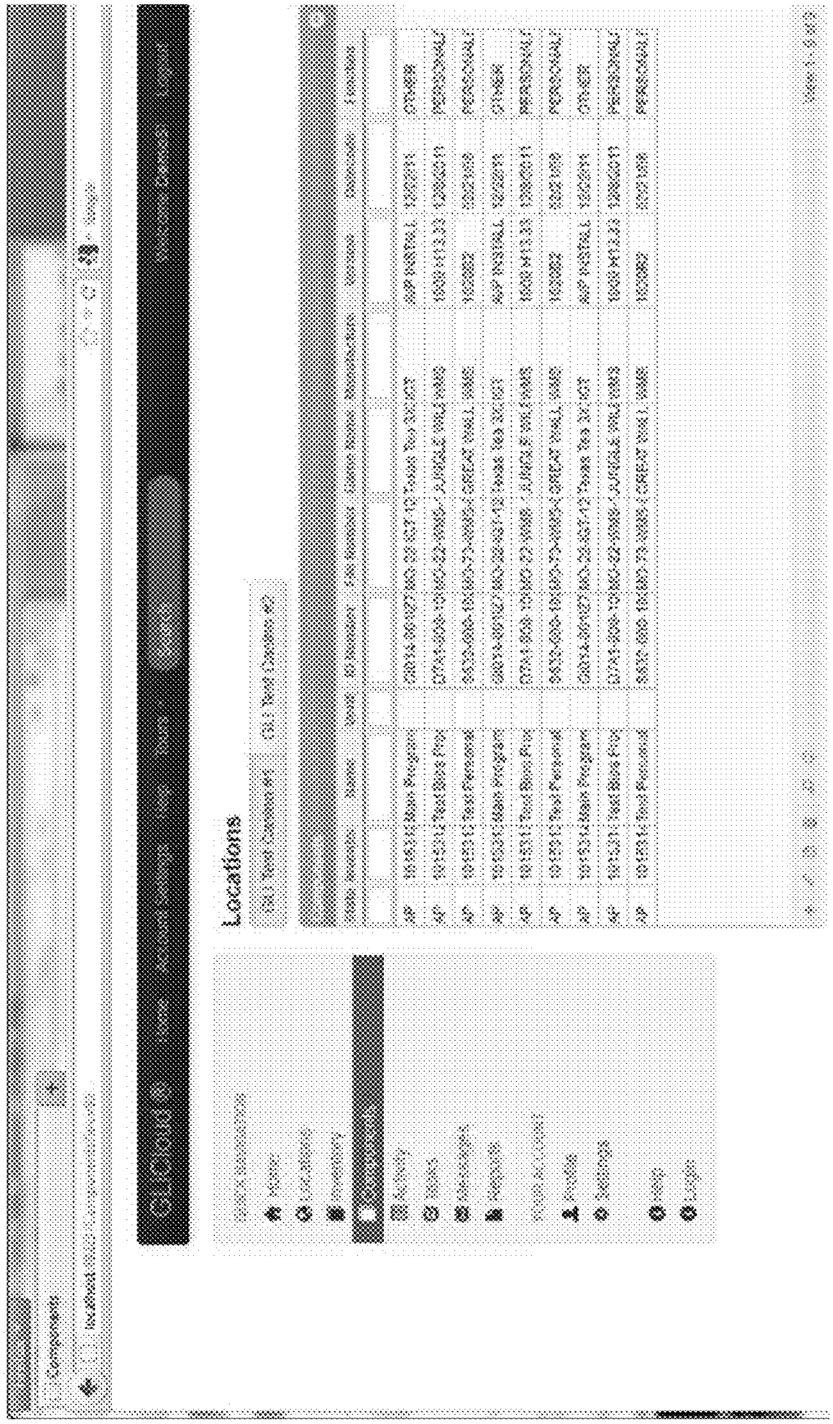
FIG. 7 illustrates a user interface screen showing an example list of gaming machine components.
Figure 8:
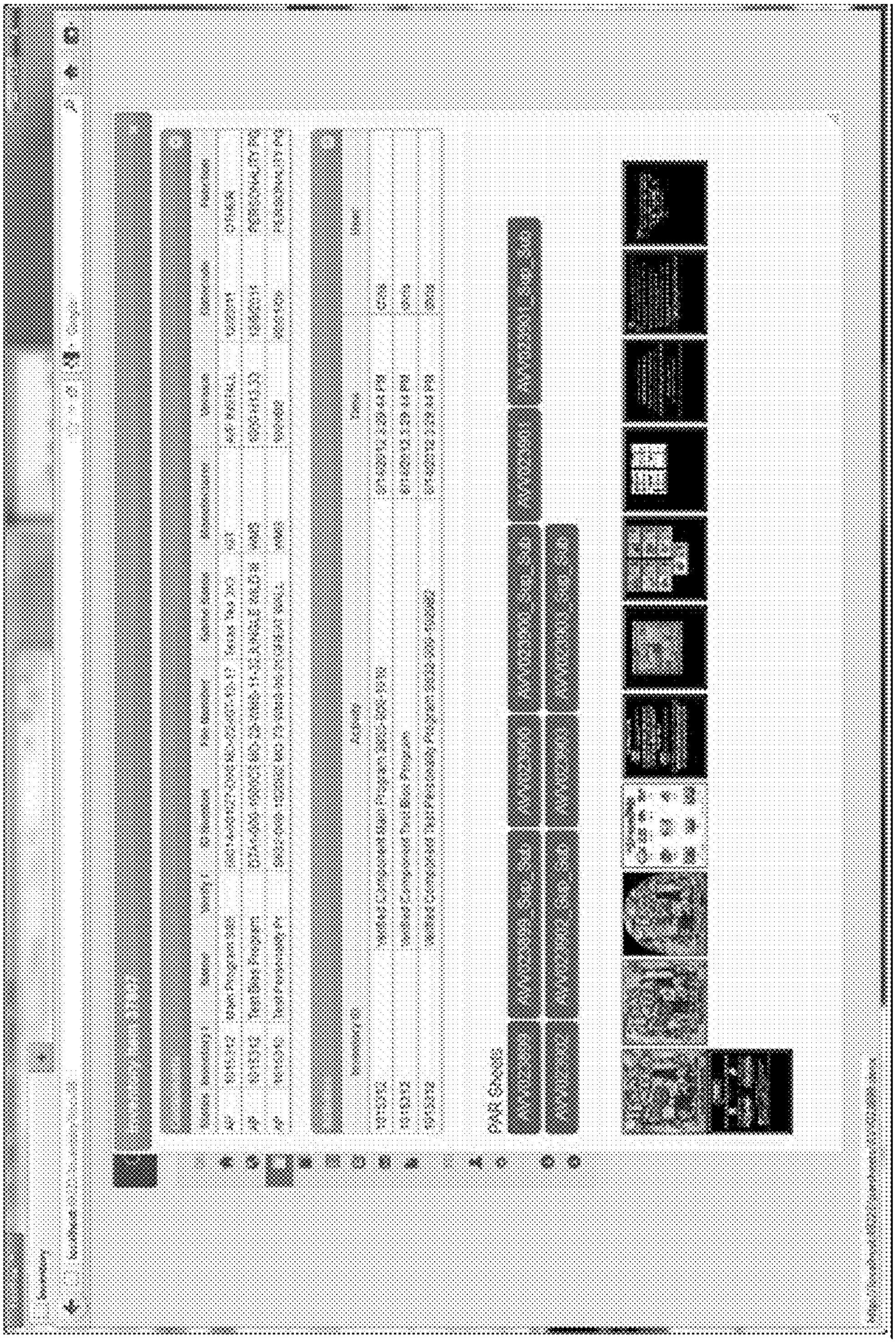
FIG. 8 illustrates a user interface screen showing an example of data for a component of a gaming machine.

Next, the casino data is associated with submission and certification information and stored in the inventory database 102. Once the information has been uploaded it may be viewed from a secure website. The storing of the information on a server potentially allows multiple authorized users to see the up-to-date status of the gaming system components remotely on their computers and mobile devices. FIG. 6 is a screenshot showing an example of the accumulation of casino data. The information may be accessed for one machine component or for all components of a gaming machine. FIG. 7 depicts an exemplary screenshot featuring a list of available gaming machine components to view.

Since the components and their data are stored on the inventory database 102 and submissions database 104 they can be associated with all of the information the document repository 106 already has regarding the components. This information generally relates both to the regulatory status of the components and meta-information such as pay screens, par sheets, and payback percentages, such as partially depicted the screenshot of FIG. 8.

Figure 9:
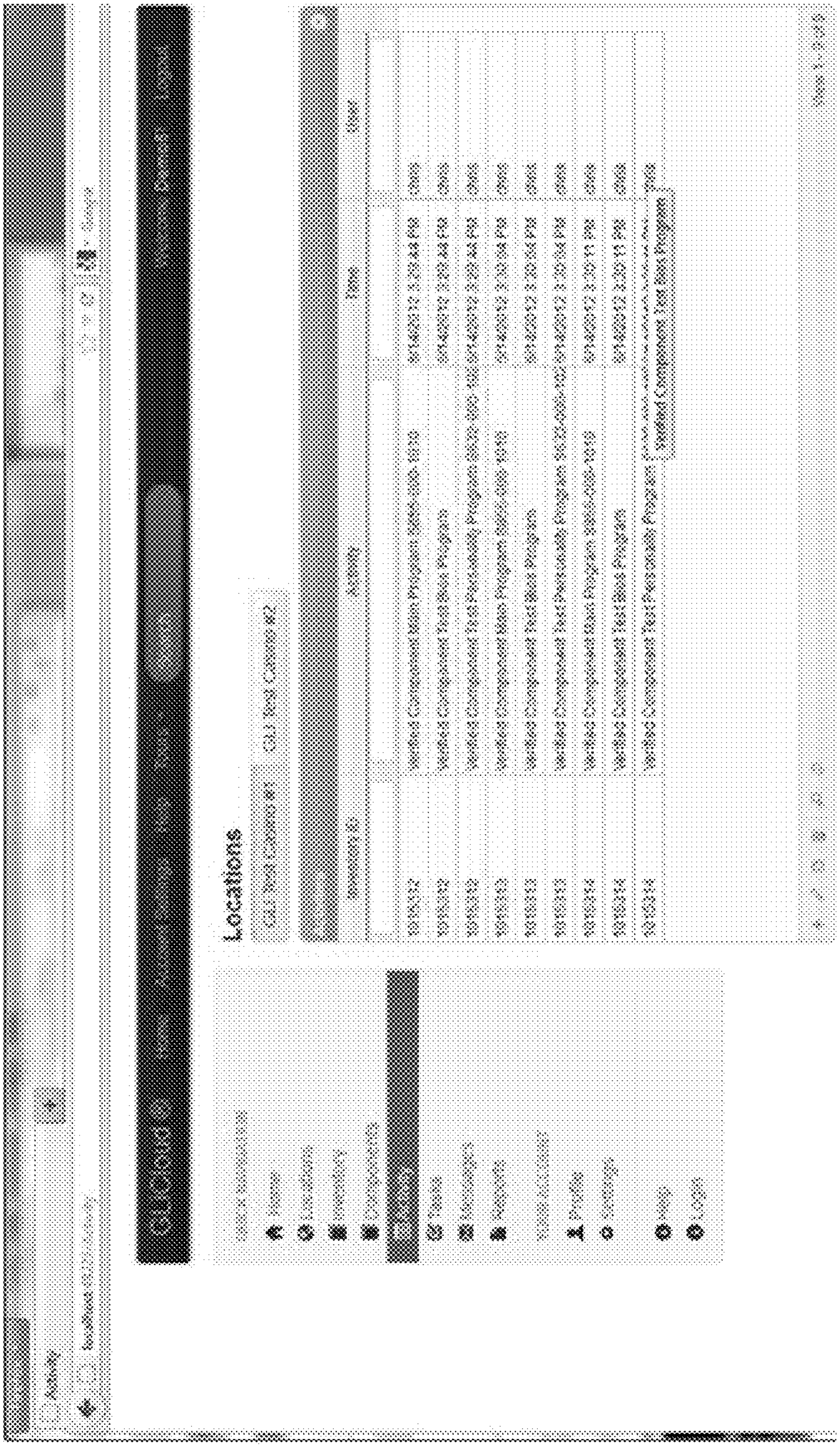
FIG. 9 illustrates a user interface screen showing an example activity log.

Additionally, since the machines in casinos are under constant surveillance, and monitored by regulatory bodies, all of the activity on the machine is also stored in an activity log associated with each gaming machine component, an example of which is depicted in FIG. 9.

Figure 10:
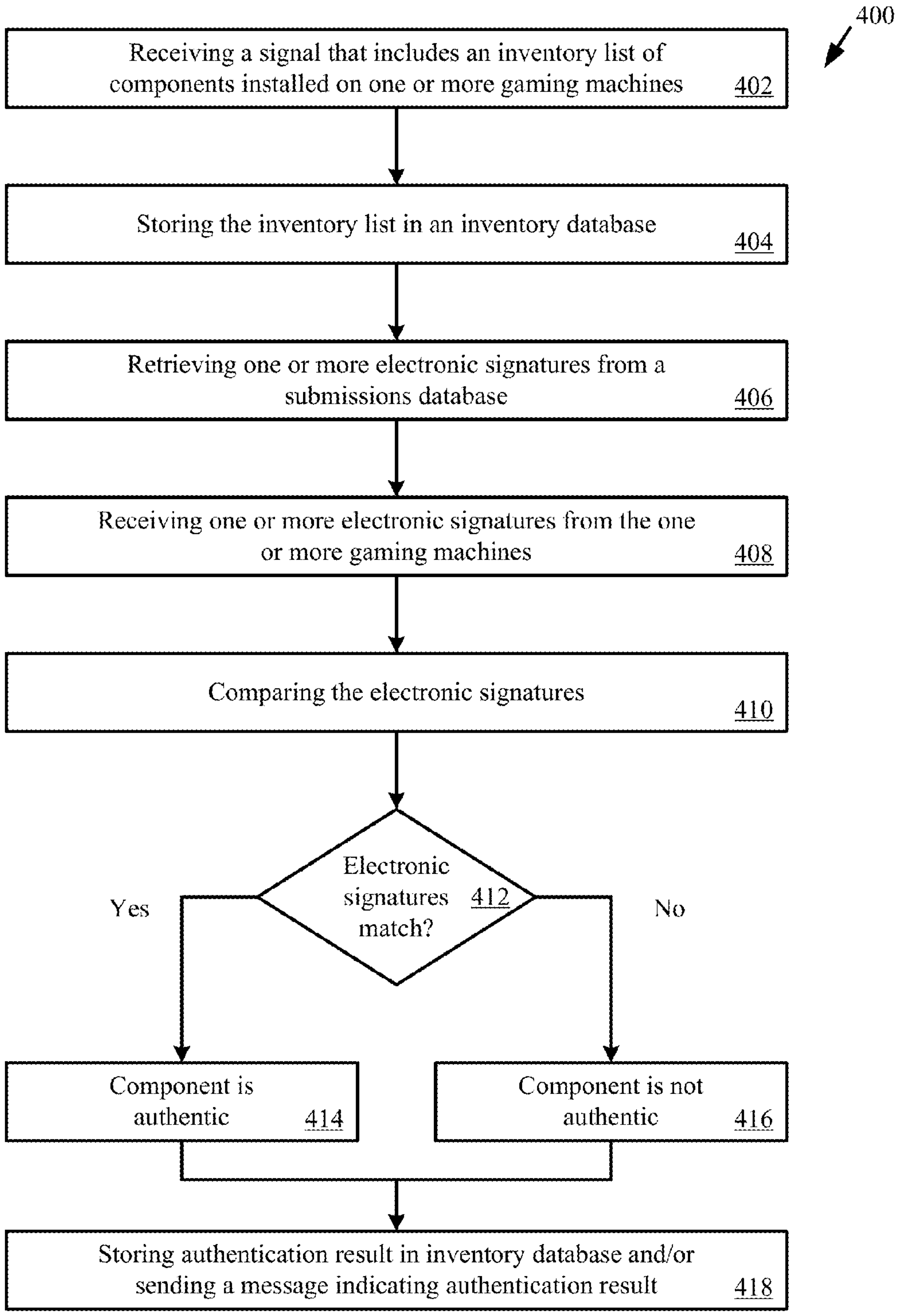
FIG. 10 illustrates a flow chart showing an example method for authenticating installed components on a gaming machine.

Referring now to FIG. 10, a flowchart is provided illustrating an example method 400. Method 400 begins with receipt, at a computing device, of a signal that includes an inventory list of components installed on one or more gaming machines 402. This inventory list may be entered directly into a computing device or may be uploaded as a table, for example as a spreadsheet. The embodiments of method 400 are not limited in this regard. The inventory list is stored in the inventory database 404. In particular scenarios, the inventory list may be stored on a computing device. In one scenario the inventory list may be stored as a table in an inventory database housed on a server, such as but not limited to server 300 of FIG. 3. In another scenario, the inventory list may be locally copied to a communication device, such as but not limited to communication device 200 of FIG. 2. In an example embodiment, a mobile device may include a local copy of an inventory database. An application running on the mobile device may synchronize the local copy of the inventory database with a cloud and/or server based inventory database. While the mobile device is operated in the field, data may then be added to the local inventory database copy for later synchronization back to the cloud/server based inventory database.

One or more electronic signatures may be retrieved from a submissions database 406. A single electronic signature may represent one or more approved components installed on a particular type of game machine. Similar to the process involving the inventory list described above, the electronic signatures may be synchronized onto a mobile device or portable computer or may be requested by a server. In one scenario, the electronic signatures from the submissions database are generated from binary images stored on a gaming authentication server, e.g. gaming authentication server 108. The binary images represent the approved components that should be installed on a gaming machine. The electronic signatures are generated by a secure hash algorithm to produce a hash value that can be used to establish, with reasonable certainty, the authenticity of a particular binary image. In a typical scenario, if two images that are supposed to be identical generate different electronic signatures, it is likely that one has been tampered with and/or is otherwise not authentic.

One or more electronic signatures are also received from one or more gaming machines 408. Gaming machines are now sold with the ability to generate an electronic signature of the software installed on them. Similar to that described above, a secure hash algorithm is used to generate a hash value indicating the contents of the gaming machine. In some scenarios, the electronic signature can be augmented to be unique to a particular regulatory agency. In one example scenario, the regulatory agency selects a seed value that is used to produce a pseudo-random electronic signature that is unique to the regulatory agency. In this scenario, the agency may enter a seed value and generate new electronic signatures based on the combination of the binary images on the game authentication server and the seed value. This process adds additional compliance security because it prevents the gaming machines from simply output the hash value instead of calculating it from the images stored on the gaming machine itself.

After the electronic signatures are received from the submissions database and the gaming machines, they are compared 410. If the electronic signature for a component retrieved from the submissions data base matches the electronic signature received from the gaming machine matches (412: Yes), the component on that gaming machine is authentic 414. If the electronic signatures do not match (412: No) the component is not authentic 416. The results of the authentication comparison may be stored in the inventory database 418. Alternatively or in addition, a message may be generated for delivery to a casino operator and/or a regulator.

Although use of a communication device 202, as described in FIG. 2, is presented herein, the present invention is not limited in this regard. The methods are useful with alternative devices as well, such as portable computer applications, PDA applications, and tablet computing devices, and the like. The method illustrated by way of example in FIGS. 4-9 and described in FIG. 10 may be performed by an electronic circuit of the communication device 202, with the assistance of the servers 110, 106, 108, 112, and databases 102, 104, 106, over the Internet or another communications network, consistent with an embodiment of the invention.

The system described in this document advantageously utilizes the following: a communication protocol that can query a device for components and signatures to automatically determine the components in a game, or on an internet game server, while verifying their authenticity; centralized storage of all the information allowing authorized persons anywhere to view and use the data; automatic association of all of the data to data maintained in a unique knowledgebase of specific and maintained information; and, dynamic database creation to allow users to automatically import the specific information for which they are concerned about tracking.

In addition to these advantageous features, embodiments of the present invention may offer additional advantages. Some advantages are particularly useful with embodiments used in a cloud computing, or "cloud" environment, e.g., as implemented over a web interface described above. Additional advantages include, but are not limited to any of the following. A slot file upload feature provides the ability to automatically upload any spreadsheet containing a gaming machine file and associated dynamic information into a database tied to the inventory database 102. An inventory tracking system provides the ability to track and maintain information associated to the machines on the casino floor from the inventory database. A component tracking feature provides the ability to monitor the approval status of all of the components installed on the machines on the casino floor.

The above described system also provides support for a communication protocol, e.g. gaming authentication terminal (GAT) protocol, that can query a device for components and signatures with a customized seed provides the ability for the regulator, or operator, to utilize their own seed to generate a unique signature and to upload the results to the inventory database 102.

Automatic Integration to backend systems allows for real time updates based on changes to a slot file on the system itself. Automatic verification of gaming content via signatures using a protocol designed to communicate to the devices through a gaming or casino system from another vendor will allow a user to verify the games on the floor from the centralized server. The system may also include the ability to generate and download binary images used for the verification of gaming content provides lottery operators the ability to generate and download binary images associated to their updated slot files on the tracking system when gaming content changes. An ability to download additional lottery specific meta-data may also be included, which is useful for some jurisdictions that require additional files that are to be loaded on the lottery system Activity logging, audit tracking, and sealing functionality provides the ability for all verification and inventory activity at a machine to be tracked in the inventory database. Automatic Notifications of revocations, moves, and the addition and removal of components provides the ability to get emailed notifications when the status changes for a component in the database, activity is performed on a machine, or a notification is released by a manufacturer.

Mobile device support allows the user to receive notifications specific to the manufacturer of a particular gaming device, or application, relating to the acceptability of the device and/or content, notifications regarding the change in regulatory status of gaming devices and/or content, and other configurable alerts on mobile devices. Attachment upload features of a mobile application, e.g. mobile component 112 of FIG. 1, allow an agent, with a mobile device, to select the slot machine, take a picture of an issue on the floor, and upload the picture for attachment to the record for that machine. Other files can also be uploaded such as incident reports and meal card information. The system may also automatically link the pay screens and par sheets for each game making them readily available under the record for the machine on the floor.

An example web interface implementation may include a task scheduler for scheduling tasks assigned to other users on the system or "cloud." This may include tasks such as verify machine, investigate incident, and tape media. Customizable reports may be generated by the system relating all of the uploaded and stored data together. User management may be included, such as the ability to add additional users and control access, which allows for the addition of personnel and the ability to manage roles associated to those personnel. This will also facilitate the sharing of information between personnel with built in security.

Integration of a communication protocol may be included that facilitates the communication with a gaming device, or server hosting gaming content, which allows for the enumeration and/or verification of the content on that device or server into a mobile application that can be run from a phone, tablet, or other mobile device. This allows for the use of the communication protocol and the associated centralized repository features to be used with mobile devices. This may include a wireless device utilizing wired and/or wireless communication protocol through Bluetooth, near field communication (NFC), USB, and the like. Automatic machine identification allows for a game to be automatically identified. This may be done through the use barcode stickers or other scanned media, Bluetooth, NFC, USB, and/or other custom protocols. GPS (global positioning system) tagging allows the ability to tag the GPS location of a game via a mobile device.

Electronic identification cards allow all activity associated with a game to be logged on an identification card through a mobile device. This will allow for real time identification card and employee activity tracking.

Live video feeds may be activated using mobile devices that allow a user to activate a live video feed from a specified location on the casino floor using a mobile device. This may assist with the evaluation of game-related problems on the floor from a remote location. Additionally, the video feeds may be recorded and stored in a repository, such as document repository document repository 106 of FIG. 1.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the methods without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method of authenticating components installed on a gaming machine, the method comprising:

receiving, from an input device, an input signal indicating the identity and location of said gaming machine, said input signal includes an inventory list of software components installed on said gaming machine;

storing, in an inventory database, a table that includes the inventory list of software components installed on said gaming machine; and for each software component listed in the table:

retrieving a first electronic signature stored in a submissions database that is representative of at least one compiled software component that should be installed on said gaming machine;

receiving, from the gaming machine, a second electronic signature representative of at least one compiled software component installed on the gaming machine;

if the first electronic signature matches the second electronic signature, storing in the inventory database an indication indicating that the compiled software component installed on the gaming machine is validated as complying with applicable regulations; and if the first electronic signature does not match the second electronic signature, (1) storing in the inventory database an indication indicating that the compiled software component installed on the gaming machine is not verified as complying with applicable regulations and (2) sending a message to an operator indicating a correct software component is not installed on the gaming machine;

wherein the first and second electronic signatures are generated using a secure hash algorithm with a customized seed value unique to a respective regulatory agency of a plurality of regulatory agencies or the operator of a plurality of gaming machine operators.

2. The method according to claim 1, further comprising:

synchronizing the inventory database and the submissions database with a local copy on a computing device;

connecting the computing device with the gaming machine through an interface; and performing the retrieving, receiving, and matching steps by the computing device.

3. The method according to claim 2, wherein the computing device is a smartphone.

4. The method according to claim 2, further comprising:

uploading a document to a document repository associated with the inventory database; and associating the document with the gaming machine in the inventory database.

5. The method according to claim 2, wherein the first electronic signature is generated by a gaming authentication server based on a binary image of the compiled software component that is stored on the gaming authentication server and the customized seed value that is determined by a user.

6. The method according to claim 5, wherein the second electronic signature is generated by the computing device based on a binary image of the compiled software component installed on the gaming device and the customized seed value.

7. The method according to claim 1, further comprising:

receiving a record of all activities regarding a gaming machine; and, storing the record to an inventory database.

8. The method according to claim 7, further comprising receiving, from the inventory database, a report of all records pertaining to the gaming machine.

9. The method according to claim 1, wherein the identity of the gaming machine is determined automatically.

10. The method according to claim 1, further comprising:

capturing a live video of the gaming machine using a camera; and, streaming the captured video to a live video feed.

11. The method according to claim 1, wherein the message sent to the operator includes a description and electronic signature of components that should be installed on the gaming machine.

12. A system for authenticating an inventory list of software components installed on gaming machines, the system comprising:

a gaming authentication server storing digital images of said software components and generating a first electronic signature that is representative of at least one compiled software component that should be installed on a gaming machine;

an inventory database storing gaming machine locations, a listing of compiled software components installed on said gaming machine, and a record of activities involving said gaming machine;

a submissions database storing the first electronic signature and a regulatory approval status of each said compiled software component in one or more jurisdictions;

a document repository storing documents for said gaming machine; and, a computing device comprising an electronic circuit and an input device, where the electronic circuit performs the following operations:

receiving, from the input device, an input signal indicating an identity and location of said gaming machine and a second electronic signature representative of at least one of said compiled software components installed on said gaming machine;

receiving, by the electronic circuit, said first electronic signature from the submissions database;

if the first electronic signature matches the second electronic signature, storing an indication in the inventory database indicating that the at least one of said compiled software components installed on the gaming machine is validated as complying with applicable regulations;

if the first electronic signature does not match the second electronic signature, storing an indication in the inventory database storage device indicating that a correct software component is not installed on the gaming machine;

wherein the first and second electronic signatures are generated using a secure hash algorithm with a customized seed value unique to a respective regulatory agency of a plurality of regulatory agencies or an operator of a plurality of gaming machine operators.

13. The system according to claim 12, wherein the first and second electronic signatures are generated using a customized initialization parameter.

14. The system according to claim 12, further comprising:

generating by the electronic circuit a record of all activities regarding the gaming machine; and, sending the record to the inventory database.

15. The system according to claim 14, further comprising receiving by the electronic circuit from the document repository a report of all records pertaining to said gaming machine.

16. The system according to claim 12, wherein the identity of the gaming machine is determined automatically by the electronic circuit.

17. The system according to claim 12, further comprising:

capturing a live video of the gaming machine using a camera associated with the electronic circuit; and, streaming the captured video to a live video feed.

18. The system according to claim 12, wherein the computing device synchronizes a local copy of the inventory database with the inventory database and a local copy of the submissions database with the submissions database.

19. The system according to claim 18, wherein the computing device connects with the game machine through an interface.

20. A computing device comprising:

a processor;

an input device;

a camera;

a memory;

a first interface connected to a server that is in communication with an inventory database and a submissions database;

a second interface connected to a gaming machine;

a computer readable storage medium containing program instructions that, when executed, cause the processor to:

synchronize, through the first interface, at least a portion of the inventory database that comprises updated information indicating the identity and location of a gaming machine;

receive, through the first interface, a first electronic signature from the submissions database, where the first electronic signature is representative of at least one compiled software component that should be installed on the gaming machine;

receive, through the second interface, a second electronic signature that is representative of at least one compiled software component installed on the gaming machine;

if the first electronic signature matches the second electronic signature, store an indication in the inventory database indicating that at least one compiled software component installed on the gaming machine is verified as complying with applicable regulations;

if the first electronic signature does not match the second electronic signature, storing an indication in the inventory database indicating that a correct software component is not installed on the gaming machine;

wherein the first and second electronic signatures are generated using a secure hash algorithm with a customized seed value unique to a respective regulatory agency of a plurality of regulatory agencies or an operator of a plurality of gaming machine operators.

* * * * *